United States Patent [19]
McLean

[11] 4,035,240
[45] July 12, 1977

[54] WATER PURIFICATION SYSTEM

[76] Inventor: Peter James McLean, 140 Talbot St., Apt. 205, St. Thomas, Ontario, Canada

[21] Appl. No.: 557,920

[22] Filed: Mar. 13, 1975

[51] Int. Cl.² .......................................... B01D 3/00
[52] U.S. Cl. ................. 202/167; 202/177; 202/181; 202/202; 203/10
[58] Field of Search ............... 202/167, 185 R, 176, 202/197, 202, 177, 181, 185 A, 235, 160; 203/10, 11, 2

[56] References Cited

U.S. PATENT DOCUMENTS

| | | | |
|---|---|---|---|
| 346,221 | 7/1886 | Rankin | 202/166 |
| 797,843 | 8/1905 | Daley | 202/166 |
| 815,392 | 3/1906 | Wentz | 202/166 |
| 833,271 | 10/1906 | Wentz | 202/166 |
| 902,277 | 10/1908 | Daley | 202/166 |
| 1,284,406 | 11/1918 | Martens | 202/166 |
| 3,532,606 | 10/1970 | Sibert | 202/181 |
| 3,616,437 | 10/1971 | Yagashita | 202/185 A |
| 3,687,817 | 8/1972 | Jimerson et al. | 202/181 |

*Primary Examiner*—Wilbur L. Bascomb, Jr.
*Attorney, Agent, or Firm*—Whittemore, Hulbert & Belknap

[57] ABSTRACT

The water purification apparatus of this invention is used in combination with a domestic hot water heating tank and comprises a water container mounted on top of the tank. Hot tank water is supplied to the container through a passage controlled by a float-actuated needle valve. Water in the container receives additional heat from a heat-radiating pipe which extends from the tank through the container and back to the tank to maintain a continuous circulation. Water vapor formed in the container is carried away through a duct and condenses. A receptacle is provided for receiving condensate from the discharge outlet of the duct.

1 Claim, 1 Drawing Figure

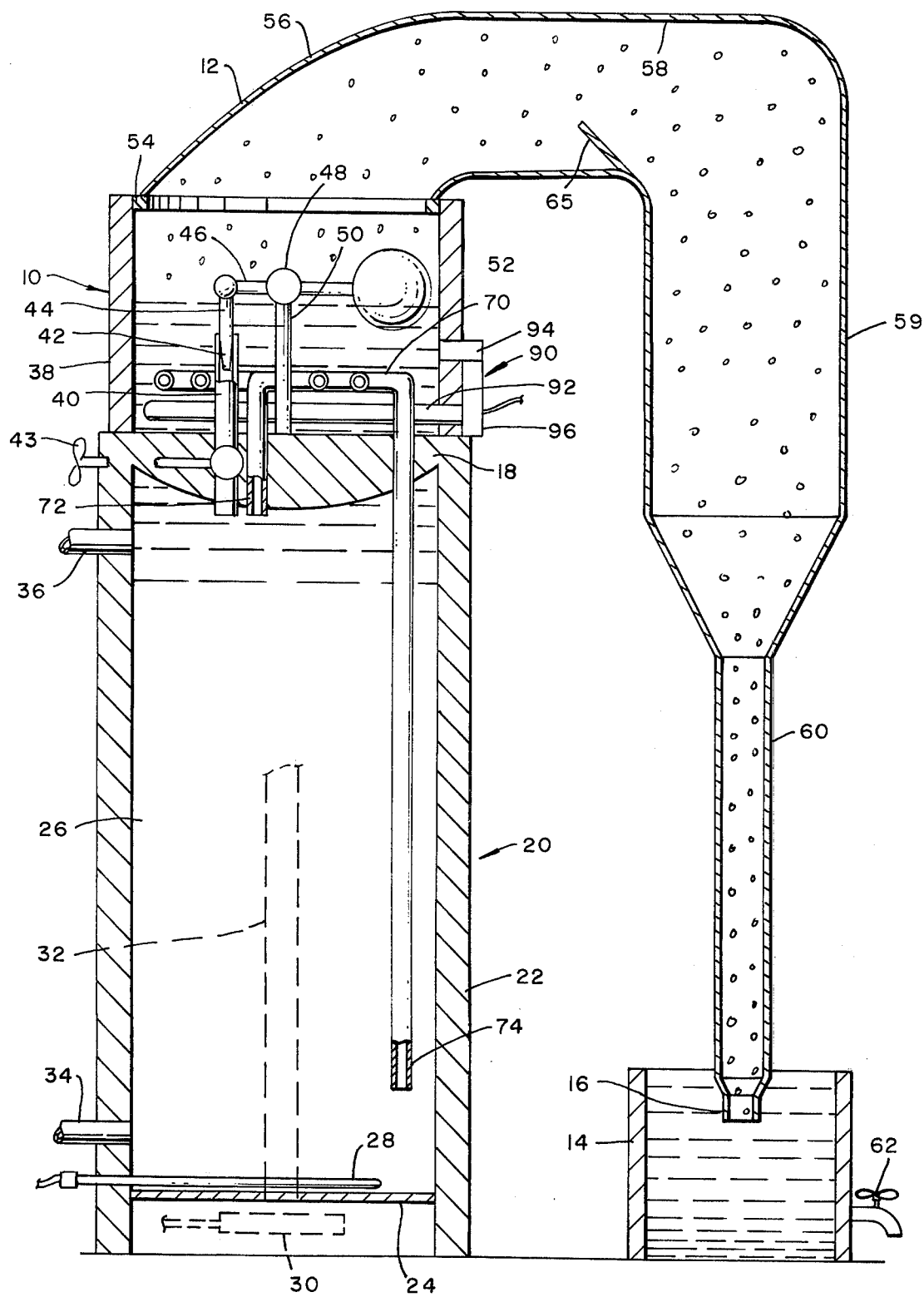

WATER PURIFICATION SYSTEM

SUMMARY OF THE INVENTION

The purpose of this invention is to make it possible to take ordinary tap water and purify it by removing objectionable minerals and other impurities, thereby rendering it more palatable for drinking purposes, cooking, watering plants, making tea, coffee, ice cubes, etc.

The apparatus includes a container which preferably is mounted on top of a conventional domestic hot water heating tank. The homeowner himself may install the apparatus. Hot water in the tank is supplied to the container. A duct leads from the top of the container to carry away water vapor as it forms. The water vapor condenses in the duct and discharges into a receptacle. Preferably a baffle is provided in the duct to prevent the return of condensed vapor to the container.

A ready supply of condensed and purified water is available in the receptacle at all times.

In the drawings:

The single FIGURE of the drawing is a vertical sectional view of apparatus embodying my invention, shown in association with a conventional domestic hot water heating tank.

Referring now more particularly to the drawing, the water purification apparatus will be seen to comprise a water container 10, a duct 12 leading from the container, and a receptacle 14 for receiving condensate from the discharge end 16 of the duct. The container 10 is mounted on the top wall 18 of the upright hot water tank 20.

The tank 20 may be a conventional hot water heating tank of the domestic type. It is shown as being generally in the form of an upright cylinder having a cylindrical wall 22 which may consist of inner and outer concentric shells provided with insulation in the space between the shells. The cylindrical wall 22 in cooperation with the top wall 18 and bottom wall 24 defines a chamber 26 in which water is held in the tank and heated. Any suitable means may be provided for heating the water in the tank, such for example, as an electric heating element 28. Alternatively a gas burner shown in dotted lines at 30 may be employed beneath the tank for this purpose. A tank heated by gas would normally have a central vent pipe shown in dotted lines at 32. The reference numeral 34 indicates a water inlet pipe to the tank and the reference numeral 36 indicates an outlet pipe for conveying hot water from the tank to various water outlets in the house.

The container 10 consists of an upright annular wall 38. It is open at the top. It may have a bottom wall or as shown the annular wall 38 may be sealed down upon the top wall 18 of the tank so that in effect the top wall of the tank is the bottom wall of the container.

Water in the tank rises into the container through the vertical water inlet pipe 40. The usual 5 to 10 PSI pressure in the hot water tank will force water up through pipe 40. This pipe extends through the top wall 18, the lower open end being in the tank chamber 26 and the upper open end being in the container. The upper end of the pipe has a conical valve seat 42. A tapered needle valve 44 is adapted to be lowered into seating engagement with the conical seat 42 to close the pipe 40 or to be raised off the seat to allow water in the tank to enter the container. The needle valve is carried by one end of an arm 46 pivoted intermediate its ends at 48 on a fixed support 50 mounted on the top of the tank. A ball float 52 on the other end of the arm rises and falls with the level of water in the container to open and close the needle valve. In this way a predetermined level of water is maintained in the container at all times. A manual shutoff valve 43 may be provided for pipe 40, if desired.

The duct 12 has an enlarged end secured over the top of the container. This enlarged end has an annular bead or rim 54 to which it is sealingly secured and this bead or rim is in turn sealingly secured to the top edge of the container. These sealed joints may be effected by welding, for example. Thus the duct provides a complete sealed cover for the container.

The water in the container is of course at or near the temperature of the water in the tank. Thus the water may be at a temperature of 175° F. to 185° F. At this elevated temperature vapor forms above the surface of the water in the container and is carried away by the duct. The duct will be seen to be of relatively large cross sectional area as it leads upward at 56 from the container, continues laterally at 58 and then extends downwardly at 59. The portions of the duct more remote from the container will be at a lower temperature and hence as the vapor moves through the duct it will condense into droplets of water which will fall into the vertical portion of the duct and drip into the reduced terminal portion 60 thereof and discharge through the lower outlet end 16. A baffle 65 in duct 12 is positioned so as to prevent the return of condensate to the container. As shown, this baffle is preferably located at the junction between the lateral and downturned sections of the duct and extends upward from the bottom of the lateral section at an incline against the direction of vapor movement. Condensation usually takes place in the lateral section at a point above the downturned section so that the condensate then drops to the outlet. The water receptacle 14 receives condensate from the discharge end 16 to provide a readily available supply of purified soft water. A tap 62 may if desired be provided for drawing water from the receptacle.

The water in the container 10 comes from the tank 20 and is initially hot. It is constantly heated by the water in the tank through the tank top wall 18. As a further means of maintaining the temperature of the water in the container at or near the temperature of the water in the tank, a water circulating pipe 70 is provided. This pipe has an extended coiled intermediate portion within the container beneath the level of water therein. Both open ends of the pipe extend down into the tank 20. One end 72 terminates near the top wall 18 of the tank. The other end 74 extends down much farther and terminates near the bottom wall 24. Since there is ordinarily a temperature difference between the regions of the tank adjacent the two ends of the pipe 70, a continuous circulation of water through the pipe is maintained to provide an auxiliary heating means for water in the container.

Auxiliary heating while not necessary, may be provided in the container 10 to supply additional heat to the water therein and thereby produce a greater amount of purified water. As shown, a booster heater 90 has a heating element 92 extending into the container beneath the water level. This is shown as being electrically operated and as having a thermostat control 94 in contact with the water. The control 94 is mounted on the outer side of the container wall and has a regulator 96 for setting the temperature at which the booster will operate. Of course, the booster heater may be operated by gas rather than electricity if desired.

What I claim is:

1. The combination with an upright domestic hot water tank having means for heating water in the tank, of a water container mounted on top of the tank, a conduit from said tank to said container to carry hot water from said tank to said container, a valve for said conduit, a float connected to said valve to maintain a predetermined level of water in said container, a duct leading from said container to convey water vapor formed in said container, said duct being secured to the top of said container in sealed relation therewith, said duct having a section extending upwardly from said container which leads to a lateral section which in turn leads to a downwardly extending section having a discharge outlet at the bottom, said laterally and downwardly extending sections of said duct being at a sufficiently lower temperature than the water in said container to condense the vapor therein, a collection receptacle positioned to receive condensate from said discharge outlet, a baffle in said duct at the juncture between said laterally and downwardly extending sections to restrict the return of condensed vapor to said container, said baffle extending from the lower wall of said laterally extending section of said duct upwardly at an acute angle toward said upwardly extending section of said duct and terminating in spaced relation to the upper wall of said laterally extending section, and an open-ended pipe extending from said tank into said container and back to said tank and having an extended intermediate heat-radiating section within said container, one end of said pipe terminating in said tank near the top and the other end of said pipe terminating in said tank near the bottom to promote circulation of hot water from the tank through said pipe thereby providing the source of heat to said heat radiating section.

* * * * *